(12) United States Patent
Sayeedi et al.

(10) Patent No.: US 7,082,303 B2
(45) Date of Patent: Jul. 25, 2006

(54) METHOD FOR SUPPORTING RESCUE CHANNELS IN A COMMUNICATIONS SYSTEM

(75) Inventors: Shahab M. Sayeedi, Naperville, IL (US); Sean S. Kelley, Hoffman Estates, IL (US); Jeffrey D. Bonta, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 585 days.

(21) Appl. No.: 10/144,379

(22) Filed: May 13, 2002

(65) Prior Publication Data

US 2002/0193113 A1    Dec. 19, 2002

Related U.S. Application Data (60) Provisional application No. 60/297,685, filed on Jun. 12, 2001.

(51) Int. Cl.
*H04Q 7/20*    (2006.01)

(52) U.S. Cl. .................. 455/439; 455/67.11; 455/226.2
(58) Field of Classification Search ........ 455/436–445; 370/331–335
See application file for complete search history.

(56) References Cited

U.S. PATENT DOCUMENTS

| | | | |
|---|---|---|---|
| 5,913,167 A | 6/1999 | Bonta et al. | |
| 6,201,969 B1 * | 3/2001 | Meier | 455/442 |
| 6,337,983 B1 | 1/2002 | Bonta et al. | |
| 6,512,927 B1 * | 1/2003 | Hunzinger | 455/452.1 |
| 2002/0065080 A1 * | 5/2002 | Pittampalli et al. | 455/439 |
| 2002/0077104 A1 * | 6/2002 | Chen et al. | 455/436 |
| 2002/0111158 A1 * | 8/2002 | Tee | 455/421 |
| 2002/0142772 A1 * | 10/2002 | Hunzinger | 455/436 |

OTHER PUBLICATIONS

Semper, Bill "Support for Rescue Chaneel in IOS V4.2 r1". Samsung Electronics Co., Ltd. 2001, no month listed.

* cited by examiner

*Primary Examiner*—Temica Beamer
(74) *Attorney, Agent, or Firm*—Lalita W. Pace (57) ABSTRACT

A method for supporting rescue channels in a communications system. The rescue channel feature supports the use of pre-allocated radio resources at neighboring BSs 104, 106 in order to attempt to recover a voice call in danger of being dropped. The MS 114 disables its transmitter upon detection of a loss of forward frames from the network. Once the source BS 102 detects a loss of transmission from the MS 114, it may attempt to re-establish communication with the MS 114 by performing soft handoff additions to rescue cells at neighboring BSs. The neighboring BSs are the MS's neighbor list, last reported Extended Pilot Strength Measurement Message (EPSMM), and possibly other factors.

26 Claims, 4 Drawing Sheets

METHOD FOR SUPPORTING RESCUE CHANNELS IN A COMMUNICATIONS SYSTEM

REFERENCES(S) TO RELATED APPLICATION(S)

The present application claims priority from provisional application, Ser. No. 60/297,685, entitled "METHOD FOR SUPPORTING RESCUE CHANNELS IN A COMMUNICATIONS SYSTEM," filed Jun. 12, 2001, which is commonly owned and incorporated herein by reference in its entirety.

FIELD OF THE INVENTION

The present invention relates generally to the field of communication systems, and more particularly, to a signaling scheme for reducing dropped calls in a wireless mobile network.

BACKGROUND OF THE INVENTION

In a cellular communication system, signaling and voice or data communications between mobile communication units and fixed communication units (such as the infrastructure which is composed of cells) are carried over an RF channel. In a CDMA system such as described by IS-95, IS-2000, or WCDMA, the RF channel is an RF carrier with signals from many communications independently spread with the use of orthogonal Walsh codes and other unique identifiers. In a TDMA system such as GSM, the RF channel is an RF carrier and timeslot combination. As a mobile unit moves through a cellular system, it becomes necessary to support a handoff of the mobile unit from the first fixed communication unit to a second fixed communication unit. In the case of CDMA, this handoff might be a soft handoff that allows the first fixed communication unit to remain connected with the mobile unit along with the second fixed communication unit. Soft handoff then permits cell site diversity to improve the communication paths by combining the best signals from each fixed communication unit connection.

Cellular systems have always been faced with the challenge of reducing or eliminating dropped calls. However, in an interference-limited environment, when the traffic channel degrades, the ability for the mobile and the infrastructure to exchange signaling messages for the purpose of handover is severely hampered. If this message exchange cannot take place, the necessary handover cannot occur to move the mobile out of its current degraded traffic channel condition. This ultimately results in a dropped call.

A partial solution to the dropped call problem is described in U.S. Pat. No. 5,913,167, METHOD FOR TRANSFERRING A COMMUNICATION LINK IN A WIRELESS COMMUNICATION SYSTEM, by Bonta, et al. The '167 patent provides the mobile with a list of reserved channels that can be used for handoff from the first fixed communication unit to the second fixed communication unit when communication between the mobile unit and a first fixed communication unit is interrupted. Although the '167 patent provides a partial solution to this problem, no mechanism exists to insure that the mobile unit and the first fixed communication unit are time coordinated to perform what amounts to a blind handoff. If the mobile unit and the infrastructure are not time-coordinated, the mobile unit may attempt to perform a handoff to infrastructure equipment that is unprepared to accept the handoff. In addition, the prior art does not provide a mechanism for handling simultaneous communication breakdowns that would lead to simultaneous dropped calls. This is particularly a problem when trying to efficiently utilize equipment resources.

Another proposed solution to the dropped call problem is provided in U.S. Pat. No. 6,337,983, Method for Autonomous Handoff in a Wireless Communication System, by Bonta, et al., which is assigned to the same assignee as the current invention. Generally, the Bonta application provides a method and apparatus for efficiently performing an autonomous handoff within a wireless communication system that reduces the chances that the infrastructure will be unprepared to accept the handoff when it occurs. More particularly, the Bonta invention utilizes a rescue channel in a handoff procedure that alleviates the need to send and receive handoff control messages. In the preferred embodiment of the Bonta invention, coordination of the rescue procedure at the infrastructure and mobile station is provided first by disabling the mobile transmitter and subsequently detecting signal loss and frame erasures at the serving cells, second by enabling the mobile transmitter and subsequently detecting signals by a rescue cell, and finally by enabling the rescue cell channel transmitter and subsequently detecting and receiving signals and frames by the mobile.

The Bonta invention however does not address the signaling between infrastructure components that must occur to implement the rescue channel procedure. Thus, there is a need for a signaling scheme between the communication system components to ensure that the infrastructure can signal the proper behavior to candidate rescue cells.

DETAILED DESCRIPTION OF THE DRAWINGS

Figure 1:
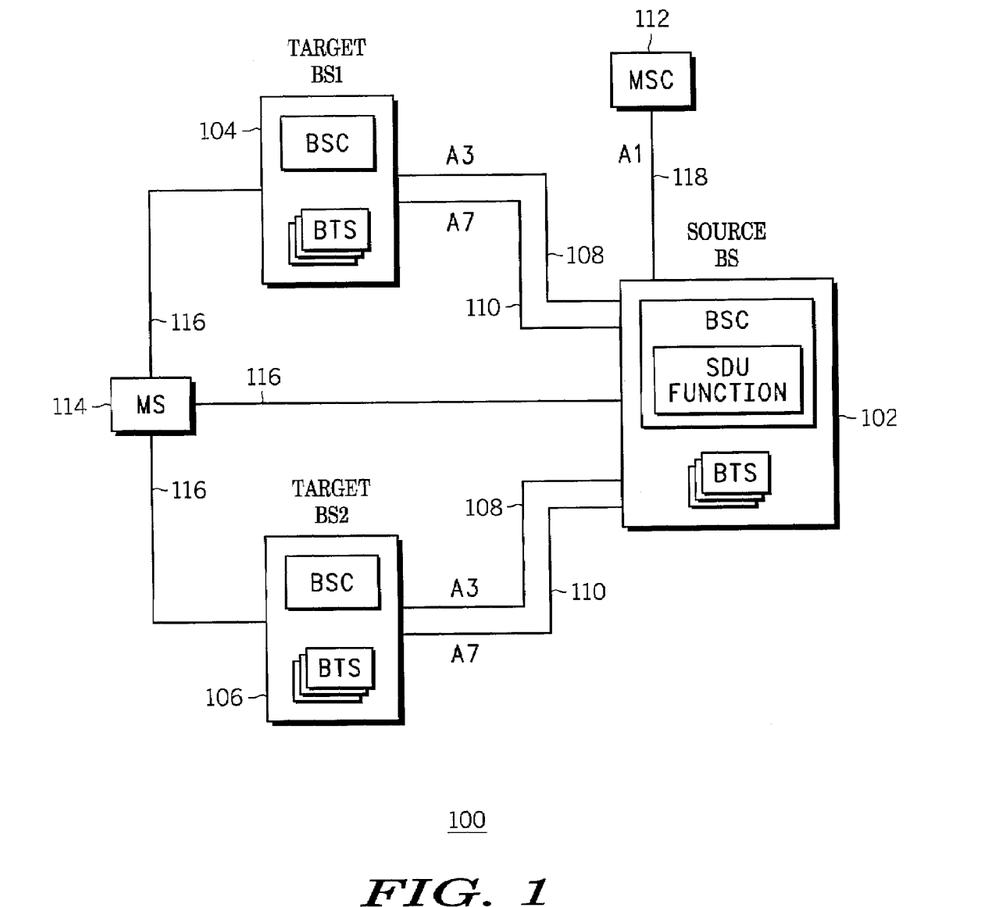
FIG. 1 is a block diagram of a communication system that can implement the method for supporting rescue channels of the present invention.

The present invention generally provides a method for supporting rescue channels in a communications system. More particularly, the invention provides a signaling scheme between the communication system components to ensure that the infrastructure can signal the proper behavior to candidate rescue cells. In the preferred embodiment, the method is implemented in a code division multiple access (CDMA) system. However, the invention can also be used in a frequency division multiple access (FDMA) or OFDM system. Referring to FIG. 1, a block diagram of a communication system 100 that can be used to implement the present invention is shown. It should be recognized by one of ordinary skill in the art that system 100 may include additional elements. The system 100 includes a source BS 102 coupled to a plurality of target BSs 104, 106 via an A3 signaling/bearer interface 108 and an A7 signaling interface 110. As defined in section 1.7.2 of the Inter-Operability Specification (IOS) for CDMA 2000 Access; TIA/EIA/IS- 2001-A; June 2001, hereinafter referred to as "the IOS," the A3 interface 108 is used for inter-BS soft/softer handoff when a target BS 104, 106 is attached to the frame selection function within the source BS 102. The A7 interface 110 is used between the source BS 102 and the target BS 104, 106 for inter-BS soft/softer handoff. A MS 114 is coupled to the BSs 102, 104, 106 via an air interface 116. The Mobile Switching Center (MSC) 112 is coupled to the source BS 102 over an A1 interface 118 for receiving a Handoff Performed message, as discussed later herein.

Generally, the rescue channel method supports the use of pre-allocated radio resources at neighboring BSs 104,106 in order to attempt to recover a voice call in danger of being dropped. The MS 114 disables its transmitter upon detection of a loss of forward frames from the network. Once the source BS 102 detects a loss of transmission from the MS 114, it may attempt to re-establish communication with the MS 114 by performing soft handoff additions to rescue cells at neighboring BSs 104,106. The neighboring BSs 104,106 are selected based on the MS's neighbor list, the last reported Extended Pilot Strength Measurement Message (EPSMM), and possibly other factors.

When the source BS 102 adds a BS to the neighbor list of the MS 114, it indicates to the MS 114 whether that neighbor supports a rescue channel. Later, if a call rescue is required, the MS 114 may autonomously promote the neighbor cell into its active set, and begin to use the pre-allocated rescue channel.

Upon reception of a predetermined number of consecutive bad frames, preferably twelve (12), the MS 114 disables its transmitter and sets a timer. After the timer expires, the MS 114 autonomously promotes one or more eligible rescue cells to its active set, re-enables its transmitter, and starts sending reverse traffic frames and an EPSMM flagging the newly promoted pilot(s). Upon recognition that the MS 114 has stopped transmitting, the source BS 102 selects a rescue cell candidate(s) based on the MS's neighbor list, last reported EPSMM, and possibly other factors, and initiates soft handoff addition procedures to prepare the target rescue cell(s) to acquire the MS 114.

The rescue A3 connection is activated when the A7 Handoff Request message is received at the target. This message indicates that a call rescue procedure is requested and in certain cases that the target BS 104, 106 should not transmit until the MS 114 is acquired. (All messages discussed in this document are defined in Section 6 of the IOS.) The target BS 104,106 indicates with an A7 Handoff Request Ack message whether the rescue procedure can be supported. If the procedure can be supported, the target BS 104, 106 begins listening for the MS 114 on the frequency indicated in the A7 Handoff Request message. When the MS 114 re-enables it's transmitter, the source BS 102 examines the EPSMM received from the MS 114 to determine if the rescue cell autonomously promoted into the active set is the same as the rescue cell selected by the source BS 102. If the EPSMM indicates that the MS 114 promoted a different rescue cell than that selected by the source BS 102, the source BS 102 adds a soft handoff leg(s) (a3/a7 connection from a source BS to a target BS for the purpose of supporting soft handoffs) to a target BS 104, 106 that was autonomously promoted by the MS 114, and releases the handoff leg(s) to the previously added rescue cell(s). The target rescue cell is instructed to begin transmitting forward frames immediately since the MS 114 is already listening for its transmission.

Once the MS 114 is successfully recovered, the call will be quickly moved from the rescue channel to a normal traffic channel on the rescue cell to make the rescue channel available for other rescue attempts. Soft handoff legs to any other potentially strong neighbors may also be added, and any weak cells may be removed. If despite rescue attempts by the infrastructure, a call fails to be recovered, normal call failure processing will occur as described in section 3.4.7 of the IOS. The flow diagrams of FIGS. 2 and 3 describe in detail the signal flows for the rescue channel method discussed generally above.

Figure 2:
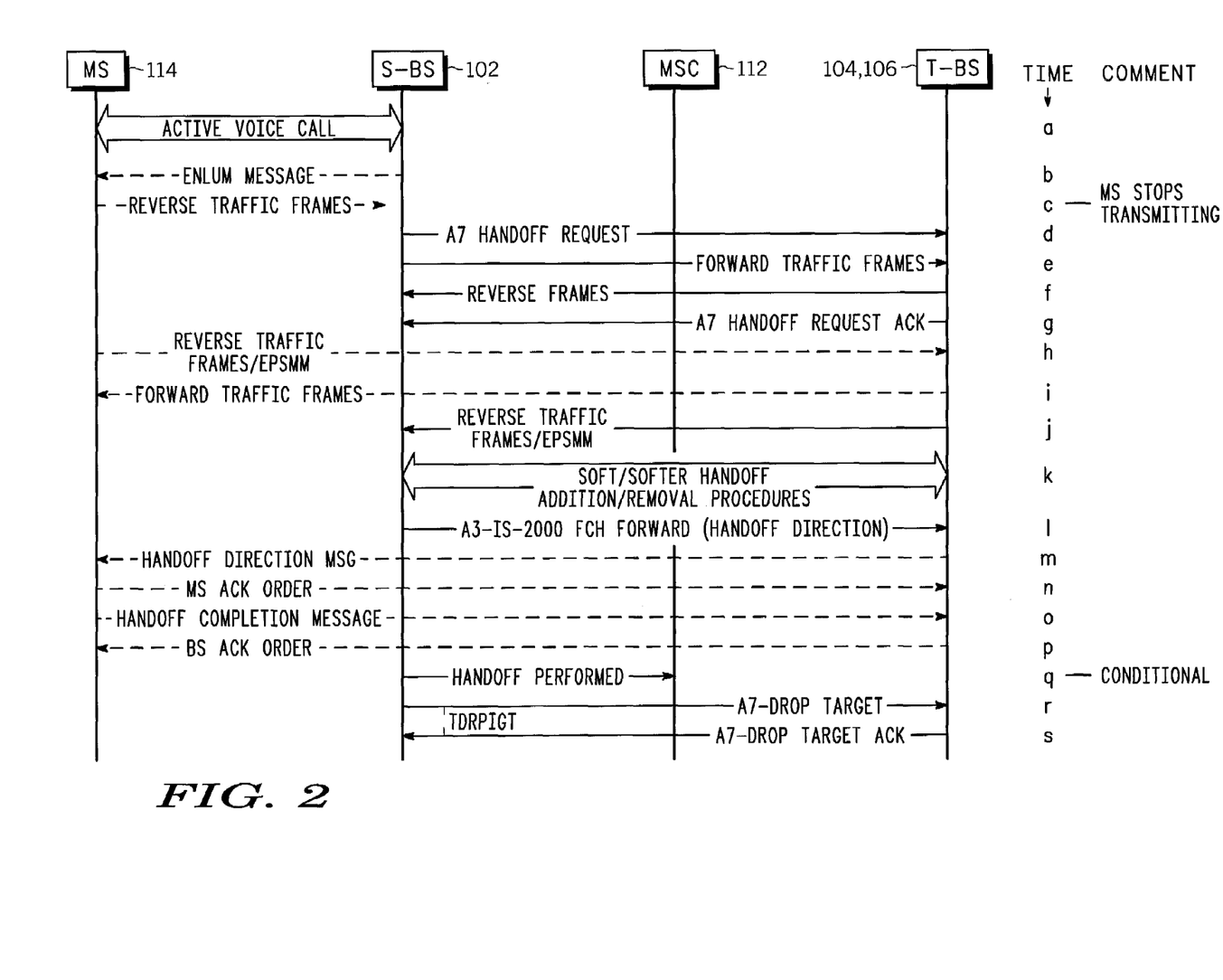
FIG. 2 is a flow diagram of a first embodiment of the rescue channel method wherein the infrastructure and the MS select the same rescue cell(s) for the rescue attempt.

In a first embodiment of the present invention, FIG. 2 shows the signal flows for the case where the source BS and the MS 114 select the same rescue cell(s) for the rescue attempt. At time a, the MS 114 is engaged in an active voice call with the network. At time b, the source BS 102 sends an Extended Neighbor List Update Message (ENLUM) to the MS 114. The ENLUM message includes the rescue channel parameters. If the MS 114 has not yet received an ENLUM, it uses the rescue channel parameters received in the Universal Neighbor List Message (UNLM), General Neighbor List Message (GNLM), or Extended Neighbor List Message (ENLM). At time c, the MS 114 receives a predetermined number of frames of insufficient signal quality and disables its transmitter. At time d, the source BS 102 detects a loss of transmission from the MS 114 and selects one or more rescue cell candidates for the MS 114 based on the MS's neighbor list, last reported EPSMM, and possibly other factors. The source BS 102 sends an A7 Handoff Request message to the target BS(s) 104, 106 indicating that a rescue cell is required. The message includes the cell ID(s) of one or more rescue cell candidates selected by the source BS 102 and the Rescue Attempt Information Element (IE) that indicates to the target BS(s) 104, 106 that a rescue procedure is being requested. The transmit flag in the element is set to "0" instructing the target BS(s) 104, 106 not to transmit forward frames until the MS 114 is acquired.

At time e, the source BS 102 begins sending forward traffic frames to the target BS(s) 104, 106 to synchronize the A3 rescue link. At time f, the target BS(s) 104, 106 begins sending reverse idle frames to the source BS 102 as soon as the first forward frame is received to synchronize the A3 rescue link. The target BS(s) 104, 106 sends reverse traffic frames if it has already acquired the MS 114. At time g, the target BS(s) 104, 106 sends an A7 Handoff Request Ack message to the source BS 102 to acknowledge whether rescue cell procedures can be supported. If the target BS(s) 104, 106 can support the rescue procedure, it attempts to acquire the MS 114 on the selected rescue cell(s). At time h, after a configurable period of time (as specified in the ENLUM/UNLM/GNLM/ENLM message), the MS 114 re-enables its transmitter. The target BS(s) 104, 106 then begins receiving reverse frames and/or EPSMM from the MS 114. At time i, the target BS(s) 104, 106 starts transmitting forward traffic frames to the MS 114 over the rescue channel(s) as soon as reverse frames are received. At time j, the target BS(s) 104, 106 sends reverse traffic frames and an EPSMM to the source BS 102. The EPSMM message indicates that at least one rescue cell selected by the source BS 102 was autonomously promoted by the MS 114 to the active set. At time k, the source BS 102 initiates soft/softer handoff addition procedures (as described in section 3.5.2.3.1 of the IOS) with the target BS(s) 104, 106 for any rescue cells that were both successfully selected by the source BS 102 and autonomously promoted into the active set by the MS 114 in order to move the call from the rescue channel on to a normal traffic channel (rescue A3 connections are not released). The source BS 102 performs soft handoff addition and removal procedures (as described in section 3.5.2.3.3 of the IOS) in order to synchronize the active sets, if necessary.

At time l, the source BS 102 sends a Handoff Direction message in the A3-IS-2000 FCH Forward message to the target BS(s) 104, 106. At time m, the target BS(s) 104, 106 sends the Handoff Direction message to the MS 114 to synchronize the active sets and move the MS 114 off the rescue channel. At time n, the MS 114 acknowledges receipt of the message with an MS Ack Order. At time o, the MS 114 indicates successful results of processing the Handoff Direction message by responding with a Handoff Completion message. At time p, the target BS(s) 104, 106 respond with a BS Ack Order. At time q, the source BS 102 may send a Handoff Performed message to the MSC. The Handoff Performed Message is conditional in accordance with section 3.3.1.3 of the IOS. The Handoff Performed message may be sent at any time after the Handoff Completion message is received at the BS. At time r, the source BS 102 sends an A7-Drop Target message to the target BS(s) 104, 106 to request release of the rescue channel(s) used to recover the call. The source BS 102 starts a timer Tdrptgt. The rescue A3 links remain connected for future rescue attempts. At time s, the target BS(s) 104, 106 sends an A7-Drop Target Ack message to the source BS 102 to acknowledge release of the specified channel(s). The source BS 102 stops timer Tdrptgt.

Figure 3:
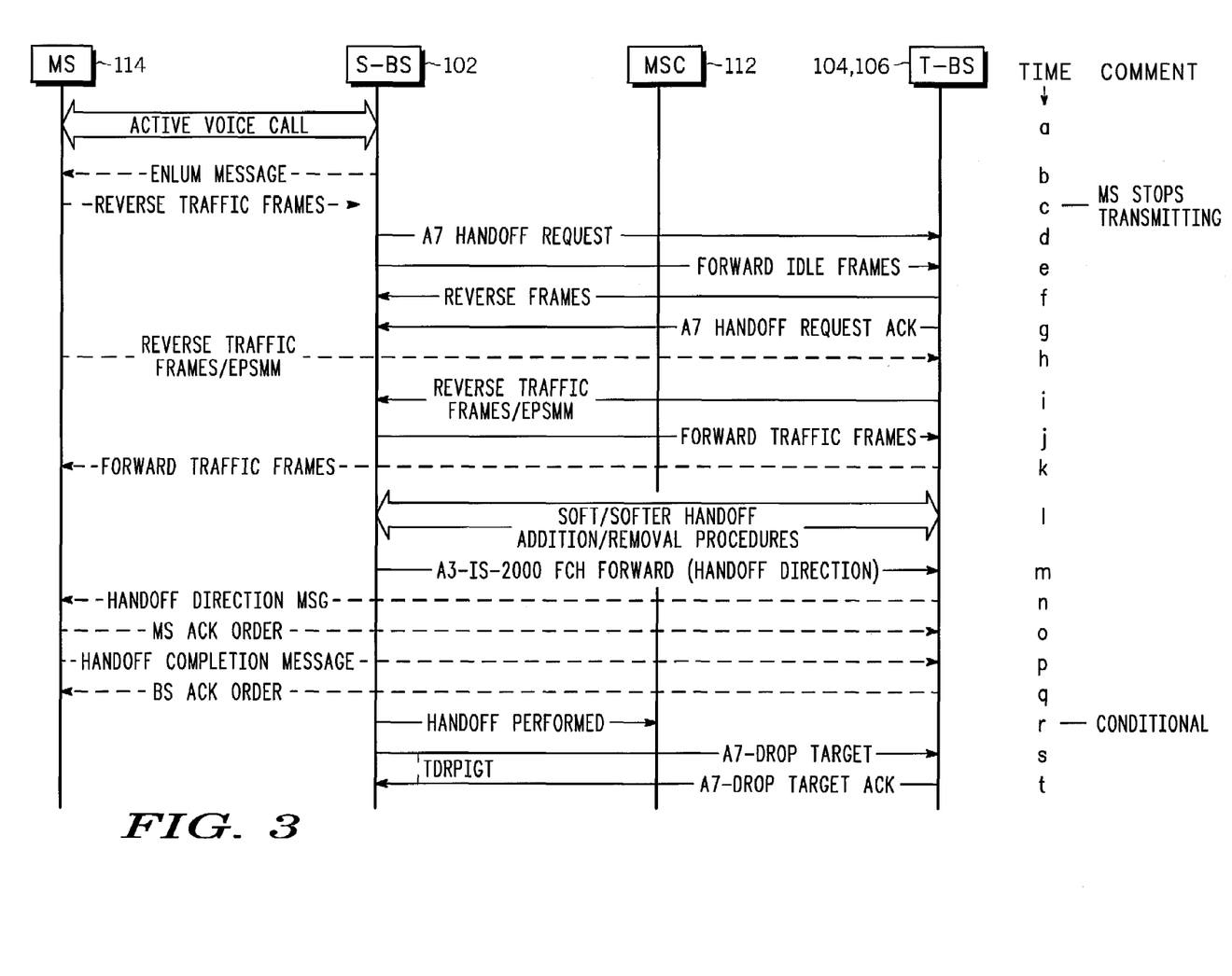
FIG. 3 is flow diagram of a second embodiment of the rescue channel method wherein the infrastructure and the MS select the same rescue cell(s) for the rescue attempt.

In a second embodiment of the present invention, FIG. 3 show alternate signal flows for the case where the source BS and the MS 114 select the same rescue cell(s) for the rescue attempt. At time a, the MS 114 is engaged in an active voice call with the network. At time b, the source BS 102 sends an ENLUM to the MS 114. The ENLUM message includes the rescue channel parameters. If the MS 114 has not yet received an ENLUM, it uses the rescue channel parameters received in the UNLM, GNLM, or ENLM. At time c, the MS 114 receives a predetermined number of frames of insufficient signal quality and disables its transmitter. At time d, the source BS 102 detects a loss of transmission from the MS 114 and selects one or more rescue cell candidates for the MS 114 based on the MS's neighbor list, last reported EPSMM, and possibly other factors. The source BS 102 sends an A7 Handoff Request message to the target BS(s) 104, 106 indicating that a rescue cell is required. The message includes the cell ID(s) of one or more rescue cell candidates selected by the source BS 102 and the Rescue Attempt Information Element (IE). The transmit flag in the element is set to "0" instructing the target BS(s) 104, 106 not to transmit forward frames until the MS 114 is acquired.

At time e, the source BS 102 begins sending forward idle frames to the target BS(s) 104, 106. At time f, the target BS(s) 104, 106 begins sending reverse idle frames to the source BS 102 as soon as the first forward frame is received to synchronize the A3 rescue link. The target BS(s) 104, 106 sends reverse traffic frames if it has already acquired the MS 114. At time g, the target BS(s) 104, 106 sends an A7 Handoff Request Ack message to the source BS 102 to acknowledge whether rescue cell procedures can be supported. If the target BS(s) 104, 106 can support the rescue procedure, it attempts to acquire the MS 114 on the selected rescue cell(s). At time h, after a configurable period of time (as specified in the ENLUM/UNLM/GNLM/ENLM message), the MS 114 re-enables its transmitter. The target BS(s) 104, 106 then begins receiving reverse frames and/or EPSMM from the MS 114. At time i, the target BS(s) 104, 106 sends reverse traffic frames and EPSMM to the source BS 102. The EPSMM indicates that at least one rescue cell selected by the source BS 102 was autonomously promoted by the MS 114 to the active set. At time j, the source BS 102 begins to send forward traffic frames to the target BS(s) 104, 106 over the rescue A3 connection. At time k, the target BS(s) 104, 106 begins transmitting forward traffic frames to the MS 114 over the rescue channel(s). At time l, the source BS 102 initiates soft/softer handoff addition procedures (as described in section 3.5.2.3.1 of the IOS) with the target BS(s) 104, 106 for any rescue cells that were both successfully selected by the source BS 102 and autonomously promoted into the active set by the MS 114 in order to move the call from the rescue channel on to a normal traffic channel (rescue A3 connections are not released). The source BS 102 performs soft handoff addition and removal procedures (as described in section 3.5.2.3.3 of the IOS) in order to synchronize the active sets, if necessary.

At time m, the source BS 102 sends a Handoff Direction message in the A3-IS-2000 FCH Forward message to the target BS(s) 104, 106. At time n, the target BS(s) 104, 106 sends the Handoff Direction message to the MS 114 to synchronize the active sets and move the MS 114 off the rescue channel. At time o, the MS 114 acknowledges receipt of the message with an MS Ack Order. At time p, the MS 114 indicates successful results of processing the Handoff Direction message by responding with a Handoff Completion message. At time q, the target BS(s) 104, 106 respond with a BS Ack Order. At time r, the source BS 102 may send a Handoff Performed message to the MSC. The Handoff Performed Message is conditional in accordance with section 3.3.1.3 of the IOS. The Handoff Performed message may be sent at any time after the Handoff Completion message is received at the BS. At time s, the source BS 102 sends an A7-Drop Target message to the target BS(s) 104, 106 to request release of the rescue channel(s) used to recover the call. The source BS 102 starts a timer Tdrptgt. The rescue A3 links remain connected for future rescue attempts. At time t, the target BS(s) 104, 106 sends an A7-Drop Target Ack message to the source BS 102 to acknowledge release of the specified channel(s). The source BS 102 stops timer Tdrptgt.

Figure 4:
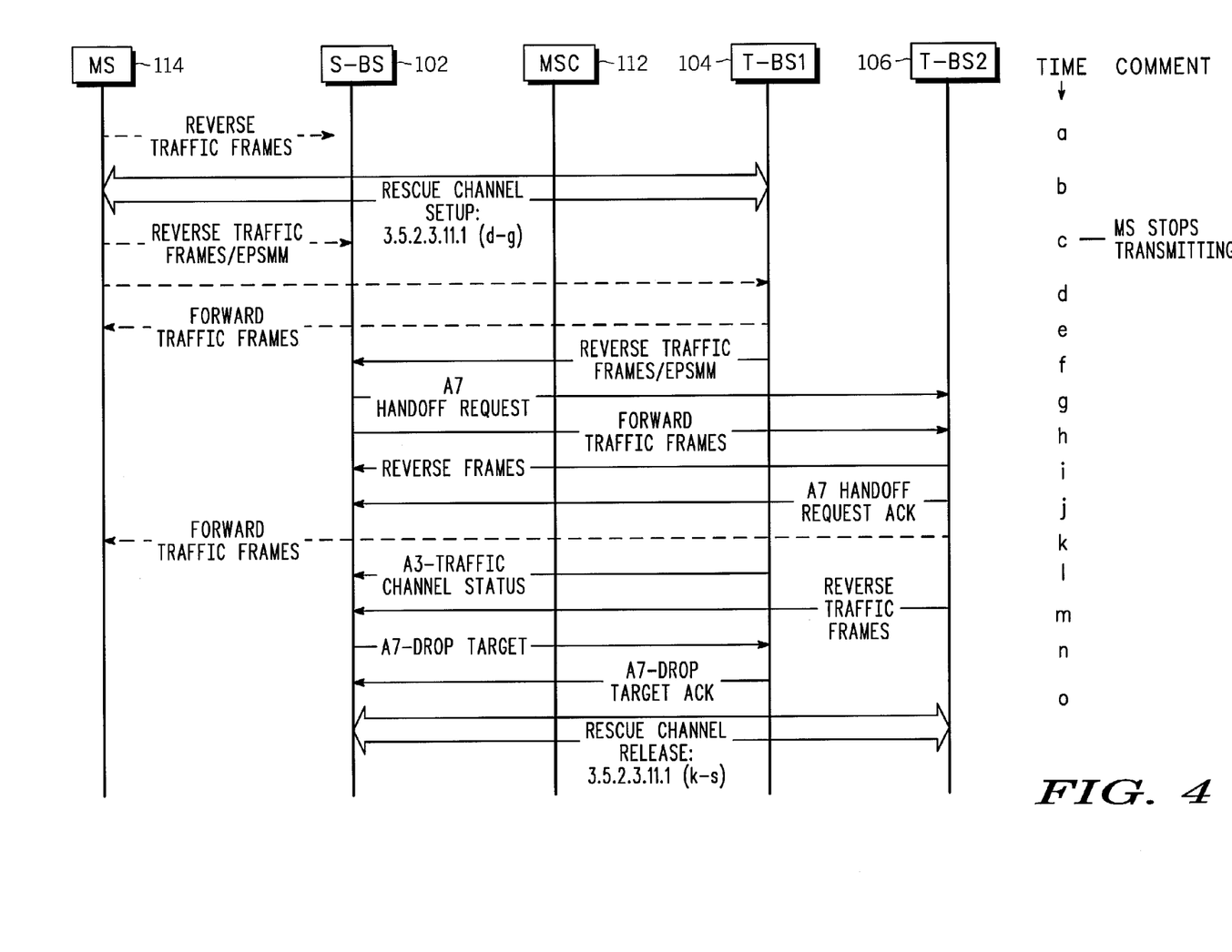
FIG. 4 is a flow diagram of a third embodiment of the rescue channel method wherein the infrastructure and the MS select different rescue cell(s) for the rescue attempt.

In a third embodiment of the present invention, FIG. 4 shows the signal flows for the case where the BS 102 and the MS 114 select different rescue cell(s) for the rescue attempt. At time a, the MS 114 receives a predetermined number of frames of insufficient signal quality and disables its transmitter. At time b, the source BS 102 initiates the rescue channel procedure with the target BS1 104 as described in steps d)–g) of the first embodiment described previously. The target BS1 104 listens for the MS 114 but does not transmit over the air. At time c, after a configurable period of time (as specified in the ENLUM/UNLM/GNLM/ENLM message), the MS 114 re-enables its transmitter. The source BS 102 and/or target BS1 104 begins receiving reverse frames and an EPSMM from the MS 114. At time d, the target BS1 104 starts transmitting forward traffic frames to the MS 114 over the rescue channel(s) as soon as it is acquired. At time e, the target BS1 104 sends reverse traffic frames and an EPSMM to the source BS 102. The EPSMM indicates that no rescue cell(s) selected by the source BS 102 matched a cell (s) autonomously promoted to the active set by the MS 114. At time f, the source BS 102 sends an A7 Handoff Request message to the target BS2 106, indicating that a rescue cell is required. The message includes the cell ID of one more rescue cell(s) autonomously promoted to the active set by the MS 114 as reported in the EPSMM message. The message also includes the Rescue Request Info IE with the transmit flag set to "1" instructing the target BS2 106 to begin transmitting forward frames to the MS 114 on the rescue channel (s) as soon as synchronization is achieved.

At time g, the source BS 102 begins sending forward traffic frames to the target BS2 106 to synchronize the A3 rescue link. At time h, the target BS2 106 begins sending reverse idle frames to the source BS 102 as soon as the first forward frame is received to synchronize the A3 rescue link. Reverse traffic frames are sent if the target BS2 106 has acquired the mobile. At time i, the target BS2 106 sends an A7 Handoff Request Ack message to the source BS 102 to acknowledge whether Rescue Channel procedures can be supported. If the target BS2 106 can support the rescue procedure, it attempts to acquire the MS 114 on the rescue cell(s). At time j, the target BS2 106 begins transmitting forward frames as soon as synchronization has occurred. At time k, if the source BS 102 has chosen to be notified of the start of transmission and reception at the target BS2 106 when its SDU function and the target BS2 106 have synchronized the A3 rescue link, the target BS2 106 replies with an A3-Traffic Channel Status message. In an alternate embodiment, this step may occur any time after the step at time f). At time I, after acquiring the MS 114, the target BS2 106 begins sending reverse traffic frames to the source BS 102. At time m, the source BS 102 sends an A7-Drop Target message to the target BS1 104 to request release of rescue channel(s) previously added in step b) that was not autonomously promoted by the MS 114. In an alternate embodiment, this step may occur anytime after the step at time d).

At time n, the target BS1 104 sends an A7-Drop Target Ack message to the source BS 102 to acknowledge removal of the specified channel(s). The Rescue A3 links are not released and remain connected for future rescue attempts. At time o, rescue channel cleanup procedures occur. Namely, the source BS 102 attempts to synchronize the active sets, moves the MS 114 off the rescue channel(s) and sends a Handoff Direction message to the MS 114. The remaining steps of the call flow are as described at times k) through s) in sections 3.5.2.3.1 of the IOS.

Those skilled in the art will recognize that various modifications and variations can be made in the apparatus of the present invention and in construction of this apparatus without departing from the scope or spirit of this invention.

What is claimed is:

1. In a communication system comprising a plurality of base systems having a plurality of base stations, a method for a controller of resources to transmit to a receiver in order to recover a call in danger of being dropped, the method comprising the steps of:
   determining whether the controller and the receiver have chosen a same resource;
   when the controller and the receiver have not chosen the same resource, determining which base station of the plurality of base stations should begin transmitting; and
   activating a transmitter of the base station that should begin transmitting.

2. The method of claim 1 wherein the step of determining whether the controller and the receiver have chosen a same resource comprises the steps of:
   receiving an extended pilot strength measurement message; wherein the message indicates whether any rescue cells selected by the controller match at least one rescue cell promoted to an active set by the receiver;
   determining that the controller and the receiver have chosen a same resource when any rescue cells selected by the controller match at least one rescue cell promoted to the active set by the receiver; and
   determining that the controller and the receiver have not chosen a same resource when none of the rescue cells selected by the controller match at least one rescue cell promoted to the active set by the receiver.

3. A rescue channel method of supporting preallocated radio resources at neighboring base systems to recover a call in danger of being dropped, the method comprising the steps of:
   detecting a loss of transmission from a mobile station;
   selecting a first rescue cell at a first base system of the neighboring base systems;
   initiating soft handoff addition procedures to prepare the first base system to acquire the mobile station;
   receiving an extended pilot strength measurement message;
   determining from the extended pilot strength measurement message whether the mobile station selected the first rescue cell; and
   when the MS did not select the first rescue cell, adding a soft handoff leg to a second base system of the neighboring base systems that was autonomously promoted by the mobile station to an active set.

4. The method of claim 3 wherein when the MS did not select the first rescue cell, the method further comprises the step of releasing soft handoff rescue channel resources with the first base system.

5. The method of claim 4 further comprising the step of instructing the second base system to begin transmitting forward frames.

6. The method of claim 3 wherein the step of selecting a first rescue cell comprises selecting the first rescue cell based on the mobile station's neighbor list.

7. The method of claim 3 wherein the step of selecting a first rescue cell comprises selecting the first rescue cell based on a last reported extended pilot strength measurement message.

8. The method of claim 3 wherein when the mobile station selected the first rescue cell candidate, the method comprises instructing the first base system to begin transmitting forward frames.

9. The method of claim 3 wherein the step of adding a soft handoff leg comprises:
   sending a message to request a handoff to the second base system with an indication in the message instructing the second base system to begin transmitting to mobile station;
   sanding forward traffic frames to the second base system; and
   receiving an acknowledgement of setup of rescue channel resources.

10. The method of claim 4 wherein the step of releasing soft handoff rescue channel resources comprises:
    sending a message to the first base system to request release of any rescue channels that were not promoted to the active set by the mobile station; and
    receiving an acknowledgment of the release of rescue channels that were not promoted to the active set by the mobile station.

11. A method of supporting rescue channels in a source base system and a target base system wherein the target base system supports at least one rescue channel, the method comprising the steps of:
    sending to a mobile station an Extended Neighbor List Update Message containing rescue channel parameters;
    detecting a loss of transmission from the mobile station;
    selecting at least one rescue cell candidate for the mobile station;

sending a message to request a handoff to the target base system indicating that at least one rescue cell is required;

sending forward traffic frames to the target base system to synchronize a rescue link;

receiving an acknowledgement from the target base system indicating whether rescue cell procedures are supported; and if rescue cell procedures are supported, acquiring the mobile station on at least one rescue channel of the at least one rescue cell candidate.

12. The method of claim 11 wherein the step of selecting one or more rescue cell candidates for the mobile station is based on at least the MS's neighbor list and last reported Extended Pilot Strength Measurement Message.

13. The method of claim 11 wherein the message to request a handoff comprises a cell ID of the at least one rescue cell candidate selected by the source base system.

14. The method of claim 11 wherein the message to request a handoff comprises a Rescue Attempt Information Element having a transmit flag, wherein the transmit flag is set to 0 instructing the target base system not to transmit forward frames until the mobile station is acquired.

15. The method of claim 11 wherein before the step of receiving an acknowledgement, the method comprises the step of sending reverse traffic frames to the source base system if the target base system has acquired the mobile station.

16. The method of claim 11 further comprising the steps of:

after a configurable period of time has elapsed, receiving by the target base system, reverse frames from the mobile station;

transmitting forward traffic frames to the mobile station over the at least one rescue channel; and transmitting reverse traffic frames and an Extended Pilot Strength Measurement Message to the source base system, wherein the Extended Pilot Strength Measurement Message indicates that the at least one rescue cell selected by the source base system was autonomously promoted to an active set of the mobile station.

17. The method of claim 16 further comprising the steps of:

initiating soft handoff addition procedures to normal traffic channels with the target base system for any rescue cells that were successfully selected by the source base system and promoted into the active set by the mobile station;

performing soft handoff addition and removal procedures in order to synchronize the active sets; and sending a Handoff Direction message in an A3-IS-20000 FCH Forward message to the target base system.

18. The method of claim 17 further comprising the steps of:

sending the Handoff Direction message to the mobile station to synchronize the active sets and move the mobile station off the at least one rescue channel;

receiving an Ack Order;

receiving a Handoff Completion message;

sending a BS Ack Order;

sending a message to request release of the at least one rescue channel; and sending an acknowledgement of the release of the at least one rescue channel.

19. A method of supporting a rescue channel procedure in a source base system and first and second target base systems wherein the first and second target base systems support at least one rescue channel, the method comprising the steps of:

detecting a loss of transmission from a mobile station;

selecting at least one rescue cell for the mobile station;

sending a message to request a handoff to the first target base system indicating that at least one rescue cell is required;

sending forward traffic frames to the first target base system to synchronize a rescue link;

receiving reverse frames from the first target base system;

receiving an acknowledgement from the first target base system indicating whether rescue cell procedures are supported;

if rescue cell procedures are supported, acquiring the mobile station on at least one rescue channel of the at least one rescue cell;

receiving reverse frames from the mobile station; and sending reverse traffic frames and an Extended Pilot Strength Measurement Message, wherein the Extended Pilot Strength Measurement Message indicates that no rescue cell(s) selected by the source base system match a cell autonomously promoted by the mobile station to an active set of the mobile station.

20. The method of claim 19 further comprising the steps of:

sending a second message to request a handoff to the second target base system indicating that at least one second rescue cell is required;

sending forward traffic frames to the second target base system to synchronize the rescue link;

sending an acknowledgement to the source base system indicating whether rescue cell procedures are supported; and if the rescue channel procedure is supported, acquiring the mobile station on the at least one second rescue channel of the at lease one second rescue cell.

21. The method of claim 20 wherein the second message to request a handoff contains a cell ID of the at least one second rescue cell that was autonomously promoted to the active set by the mobile station.

22. The method of claim 21 wherein the second message to request a handoff further includes a Rescue Request Info Identifier Element having a transmit flag, wherein the flag is set to "1" instructing the second target base system to begin transmitting forward frames to the mobile station on the at least second rescue channel as soon as synchronization is achieved.

23. The method of claim 20 further comprising the steps of:

transmitting forward traffic frames to the mobile station;

sending reverse traffic frames to the source base system;

sending a message to the first target base system to request release of any of the at least one rescue channels that was not autonomously promoted to the active set by the mobile station; and sending an acknowledgement message to the source base system to acknowledge removal of the any of the at least one rescue channels.

24. The method of claim 23 further comprising the steps of:

synchronizing the active sets;

moving the mobile station off of the at least one rescue channel; and sending a Handoff Direction message in an A3-IS-20000 FCH Forward message to the mobile station.

25. A method of supporting rescue channels in a source base system and a target base system wherein the target base system supports at least one rescue channel, the method comprising the steps of:
   sending to a mobile station an Extended Neighbor List Update Message containing rescue channel parameters;
   detecting a loss of transmission from the mobile station;
   selecting at least one rescue cell candidate for the mobile station;
   sending a message to request a handoff to the target base system indicating that at least one rescue cell is required;
   sending forward idle frames to the target base system;
   receiving an Extended Pilot Strength Measurement Message from the target base system;
   determining from the Extended Pilot Strength Measurement Message whether the source base system and target base systems have selected a same rescue cell candidate; and
   when the source base system and target base systems have selected the same rescue cell candidate, sending forward traffic frames to the target base system.

26. The method of claim 25 further comprising the step of sending forward traffic frames to the mobile station.

* * * * *